US009953359B2

(12) United States Patent
Argue et al.

(10) Patent No.: US 9,953,359 B2
(45) Date of Patent: Apr. 24, 2018

(54) COOPERATIVE EXECUTION OF AN ELECTRONIC SHOPPING LIST

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 827 days.

(21) Appl. No.: 13/753,386

(22) Filed: Jan. 29, 2013

(65) Prior Publication Data

US 2014/0214595 A1 Jul. 31, 2014

(51) Int. Cl.
*G06Q 30/06* (2012.01)

(52) U.S. Cl.
CPC ................................ *G06Q 30/0633* (2013.01)

(58) Field of Classification Search
None
See application file for complete search history.

(56) References Cited

U.S. PATENT DOCUMENTS

| | | | |
|---|---|---|---|
| 6,064,749 A | 5/2000 | Hirota | |
| 6,619,546 B1 | 9/2003 | Nguyen | |
| 6,910,697 B2 | 6/2005 | Varatharajah | |
| 6,954,735 B1 | 10/2005 | Djupsjobacka | |
| 6,997,382 B1 | 2/2006 | Bhri | |
| 7,150,395 B1 | 12/2006 | White | |
| 7,337,960 B2 | 3/2008 | Ostrowski | |
| 7,580,699 B1 | 8/2009 | Shaw | |
| 8,015,076 B2 | 9/2011 | Owens | |
| 8,196,822 B2 | 6/2012 | Goncalves | |
| 8,239,276 B2 | 8/2012 | Lin | |
| 2010/0262554 A1* | 10/2010 | Elliott | 705/323 |
| 2012/0253905 A1 | 10/2012 | Darragh | |
| 2013/0066750 A1* | 3/2013 | Siddique et al. | 705/27.2 |
| 2013/0211953 A1* | 8/2013 | Abraham | G06Q 30/06 705/26.8 |

* cited by examiner

*Primary Examiner* — Douglas W Owens
*Assistant Examiner* — Laura Yesildag
(74) *Attorney, Agent, or Firm* — Bryan Cave LLP

(57) ABSTRACT

A computer-implemented method is disclosed herein. The method includes the step of receiving, with a processing device of a commerce server, one or more shopping list signals from an electronic computing device to establish a shopping list of a plurality of items offered for sale in a retail store. The method also includes the step of receiving, with the processing device, one or more consumer signals from a first augmented reality device and a second augmented reality device. Each augmented reality device can be worn by a consumer as the consumer shops in the retail store. The method also includes the step of transmitting, with the processing device, a first procuring signal containing data associated with the shopping list to the first augmented reality device and a second procuring signal containing data associated with the shopping list to the second augmented reality device, such that the consumers can cooperatively shop for items on the shopping list.

20 Claims, 7 Drawing Sheets

COOPERATIVE EXECUTION OF AN ELECTRONIC SHOPPING LIST

BACKGROUND INFORMATION

Field of the Disclosure

The present invention relates generally to the use of a shopping list that can be created electronically. In particular, a pair of consumers can cooperatively complete the purchase of items on the shopping list.

Background

Some retail stores extend across tens of thousands of square feet and offer thousands of items for sale. Many consumers visit such retail stores when shopping for a diverse set of items such as groceries, office supplies, and household wares. Typically, these stores can have dozens of aisles and/or departments. Accordingly, traversing these aisles looking for specific items may be a challenging experience. Shopping lists can assist a consumer in focusing on the items to purchase, to complete a shopping trip successfully and efficiently. However, shopping lists can be difficult to manage while the consumer is traversing the store looking for items and avoiding other consumers. Consumers may attempt to cooperatively shop, such as by splitting a shopping list. However, purchasing decisions may arise requiring the consumers to consult one another.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
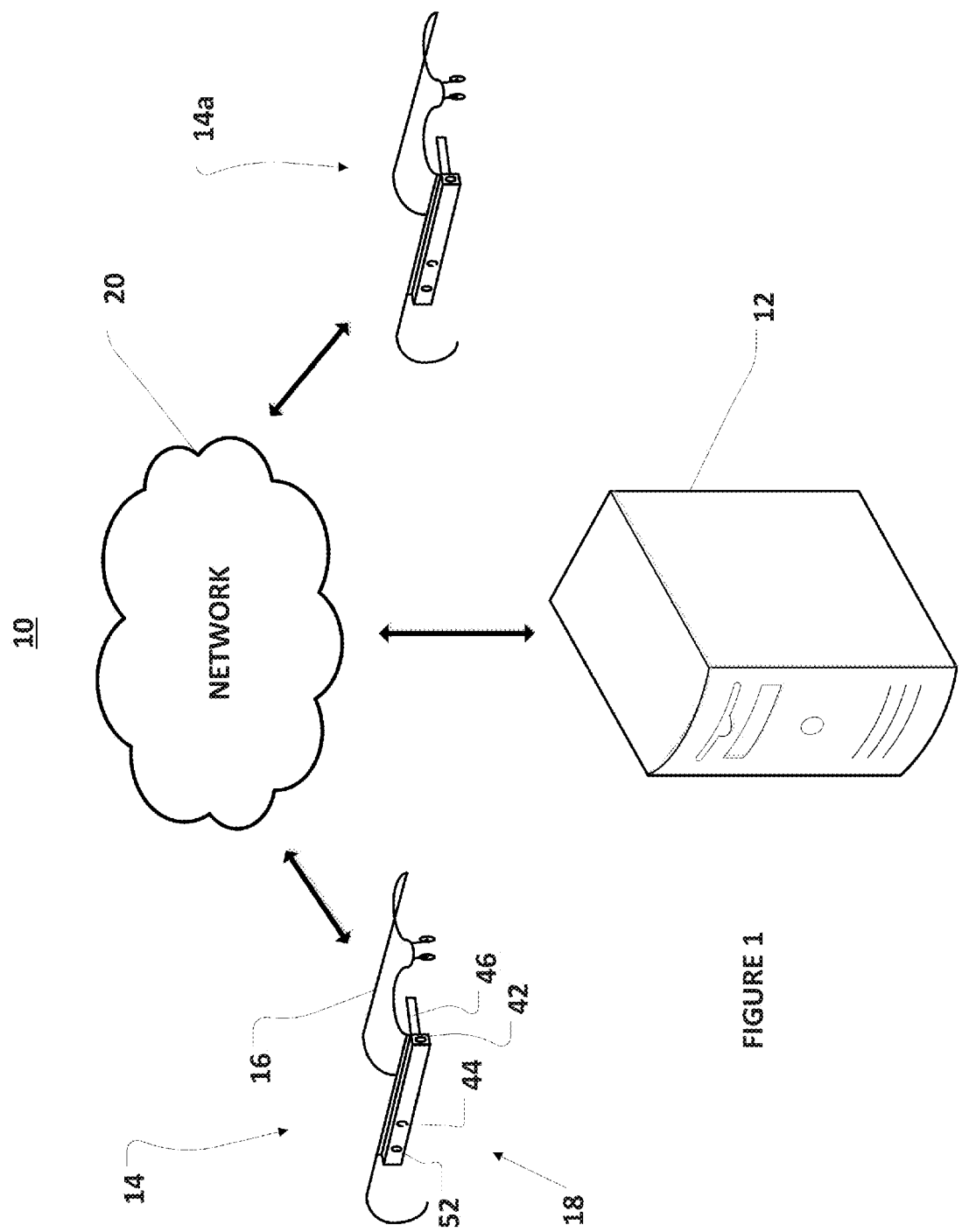
FIG. 1 is an example schematic illustrating a system according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist consumers that are shopping in a retail store. An embodiment of the present disclosure can assist a pair of consumers in executing a shopping list together and will help the consumers shop more efficiently. An embodiment of the present disclosure can help reduce the time and stress that can arise while shopping, and thus make the shopping trip a more enjoyable and more social experience.

A shopping list management system according to some embodiments of the present disclosure can be operable to receive one or more shopping list signals from an electronic computing device in order to establish a shopping list for a consumer. A shopping list can include a plurality of items that are offered for sale in a retail store. The shopping list can be completed and transmitted to a commerce server of the shopping list management system. The shopping list can be transmitted as a single shopping list signal, wherein a "single" shopping list signal contains the identities of a plurality of items. Alternatively, the shopping list can be established item-by-item with a plurality of shopping list signals, wherein each item is individually communicated in a shopping list signal to the commerce server.

The shopping list can be generated with an electronic computing device possessed by the consumer. An electronic computing device used by a consumer can be a laptop computer, a desktop computer, a smart-phone, a tablet, an e-reader, or any other electronic computing device operable to generate and transmit a shopping list signal.

A shopping list management system according to some embodiments of the present disclosure can be operable to receive one or more consumer signals from first and second augmented reality devices. Each of the consumers can wear one of the augmented reality devices as the consumers shop in the retail store. It is noted that in some embodiments, the consumers can be shopping in the different geographically-located retail stores; one of the consumers can be shopping at a first store location of a retailer and the other consumer can be shopping at a second store location of the retailer.

Each of the one or more consumer signals can contain information associated with the shopping experience of the consumer. For example, a consumer signal can be indicative that the consumer has acquired an item on the shopping list. The consumer's voice can be contained in a signal transmitted by the augmented reality device. This consumer signal can be received by a commerce server. Statements made by the consumer, contained in a consumer signal, can indicate that the consumer has acquired an item on the shopping list.

A consumer signal can also indicate that the consumer desires cooperative shopping interaction with the other consumer. For example, a first consumer signal can contain a verbal request from a first consumer to be placed in audio contact with a second consumer. A desire for cooperative shopping interaction can arise when the shopping list does not precisely indicate how to make a particular purchasing decision. For example, the shopping list may contain a particular brand and one of the consumers may discover that the desired brand is not available. Alternatively, the shopping list may contain a particular brand and one of the consumers may discover that another brand is being offered at a much lower price. Before a purchasing decision is made, one consumer can transmit a consumer signal with the augmented reality device, wherein the consumer signal contains a request to be linked to the other consumer in audio or video communication. As set forth in greater detail below, a system according to some embodiments of the present disclosure can place the consumers in communication with one another in response to a request for cooperative shopping interaction.

A consumer signal can also contain data associated with one of the consumers as that consumer shops. For example, an augmented reality device can have the capacity to continuously, regularly, or intermittently transmit signals containing data indicating the consumer's position with the retail store and/or the direction that the consumer is facing. In some embodiments of the present disclosure, a consumer signal from a first consumer can contain a request for the location of the second consumer. The respective positions of the consumers can be shared between the consumers in some embodiments of the present disclosure to enhance the efficiency of the shopping experience.

A shopping list management system according to some embodiments of the present disclosure can also be operable to transmit procuring signals containing data associated with the shopping list. A procuring signal can contain various kinds of data. The procuring signals can be transmitted to the augmented reality devices. The procuring signals can assist the consumers as they cooperatively shop for items on the shopping list. An exemplary procuring signal can be an item signal that indicates a particular item on the shopping list for a consumer to currently pursue. Different item signals can be transmitted to the respective augmented reality devices worn by the first and second consumers so that each consumer can pursue a different item. A procuring signal can also be transmitted to a first consumer when a second consumer has acquired an item on the shopping list to prevent the first consumer from also pursing the item.

The procuring signal can contain audio, video, and/or textual data. The procuring signal transmitted to a first augmented reality device can contain data originating from a second augmented reality device. For example, a video signal generated by an augmented reality device worn by a first consumer can define a consumer signal when transmitted to a commerce server in some embodiments of the present disclosure. The video signal and data contained therein can be transmitted by the commerce server to a second augmented reality device worn by a second consumer and thus define a procuring signal.

The procuring signal can be transmitted by a commerce server in response to a consumer signal received by the commerce server. For example, a consumer signal received from a first augmented reality device can contain a request for access to a video signal generated by a second augmented reality device. In response to the request contained in the consumer signal received from the first augmented reality device, the procuring signal containing the video signal can be transmitted to the second augmented reality device in some embodiments of the invention. In another example, a consumer signal can contain a request for the location of one of the consumers. In response, a commerce server can transmit a procuring signal containing a viewable map to the initiator of the consumer signal wherein the map shows the location of one or both of the consumers.

Embodiments of the present disclosure provide numerous benefits to consumers. Embodiments of the present disclosure can allow a pair of consumers to complete a shopping list in cooperation with another. The acquisition of all of the items on the shopping list can thus be accomplished more efficiently.

FIG. 1 is a schematic illustrating a shopping list management system 10 according to some embodiments of the present disclosure. The shopping list management system 10 can implement a computer-implemented method that includes the step of receiving, with a commerce server 12, one or more shopping list signals from a consumer. A single shopping list signal can contain a shopping list. A shopping list can be a plurality of items offered for sale at a retail store that the consumer intends to purchase. Alternatively, a shopping list can be created item-by-item, wherein an individual signal for each item is communicated to the commerce server 12 and the commerce server 12 aggregates the items into a shopping list.

The one or more shopping list signals can be communicated to the commerce server 12 with an electronic computing device possessed by the consumer. The one or more shopping list signals can be communicated from a location that is remote from the retail store or that is within the retail store. The one or more shopping list signals can also be communicated from a kiosk located within the retail store, wherein the kiosk houses an electronic computing device. The one or more shopping list signals can also be communicated with an augmented reality device worn by a consumer, such as a head mountable unit 14.

The head mountable unit 14 can be worn by a consumer while the consumer is shopping within the retail store. In the illustrated embodiment of FIG. 1, the exemplary head mountable unit 14 includes a frame 16 and a communications unit 18 supported on the frame 16. A second consumer can be wearing a second augmented reality device, such as a head mountable unit 14a. The head mountable units 14, 14a can be substantially similar. The description of the head mountable unit 14 contained herein can therefore also be applicable to the head mountable unit 14a.

Signals transmitted by the head mountable unit 14 and received by the commerce server 12, and vice-versa, can be communicated over a network 20. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The head mountable unit 14 can transmit one or more consumer signals to the commerce server 12 over the network 20. A consumer signal can be any signal transmitted by the head mountable unit 14 to the commerce server 12. A video signal can be generated by a camera 42 of the head mountable unit 14 and transmitted to the commerce server 12. The video signal can be a consumer signal. The video signal can capture a field of view aligned with the consumer's field of view. Thus, the commerce server 12 can "see" what the consumer sees.

The commerce server 12 can transmit procuring signals to the head mountable units 14, 14a. A procuring signal can be any signal transmitted by the commerce server 12 that in any way facilities the consumer in acquiring items on an electronic shopping list that is maintained by the commerce server 12. A first procuring signal containing data associated with the shopping list can be transmitted to the first augmented reality device 14 by the commerce server 12 and a second procuring signal containing data associated with the shopping list can be transmitted to the second augmented reality device 14a by the commerce server 12. The procuring signals can help the consumers cooperatively shop for items on the shopping list.

Figure 2:
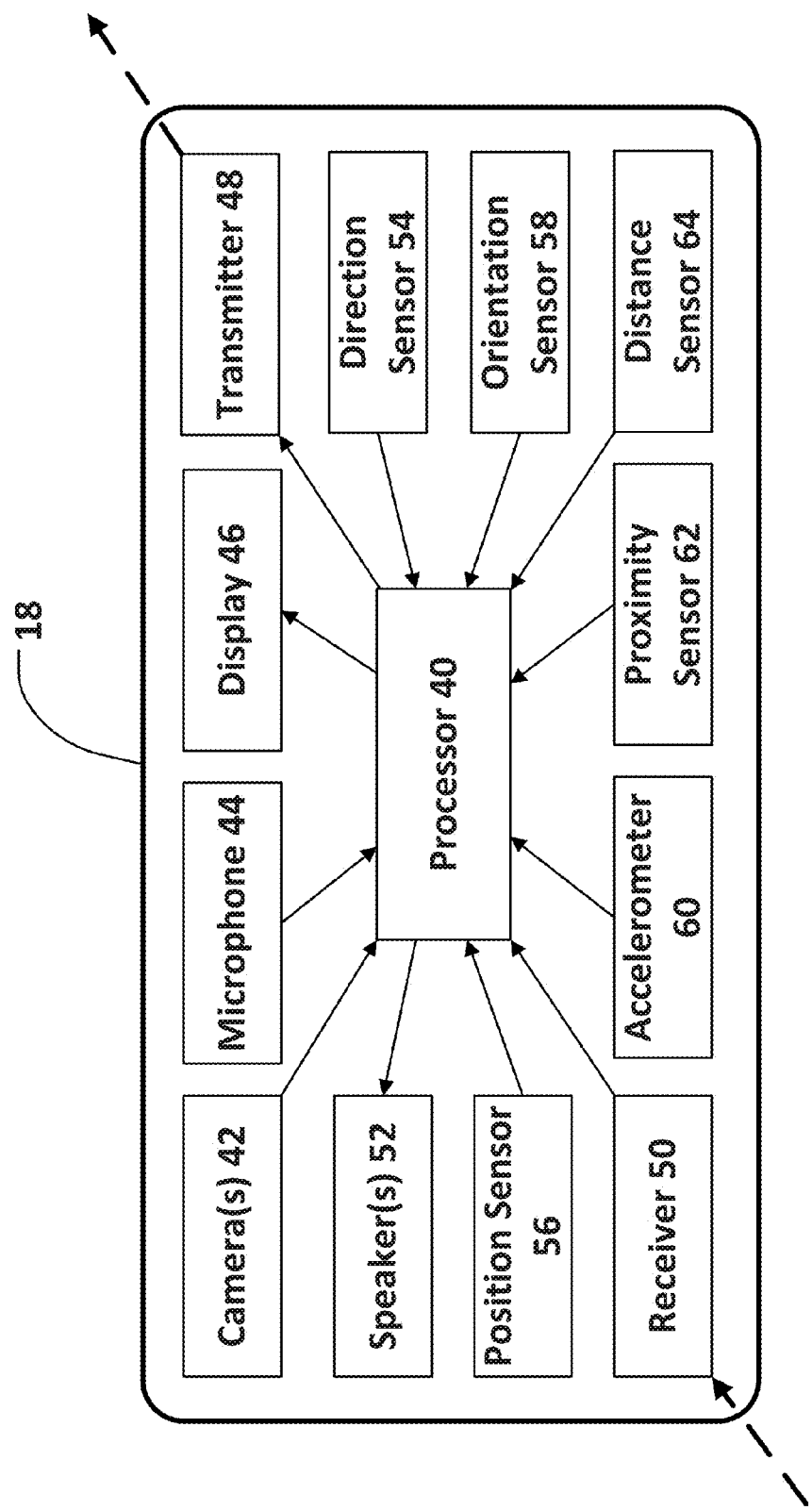
FIG. 2 is an example block diagram illustrating an augmented reality device unit that can be applied in some embodiments of the present disclosure.

FIG. 2 is a block diagram illustrating exemplary components of the communications unit 18. The communications unit 18 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 18. The processor 40 can also be operable to control the other components of the communications unit 18. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, cameras 42 may be a plurality of forward-facing cameras 42. The cameras 42 can be a stereo camera with two or more lenses with a separate image sensor or film frame for each lens. This arrangement allows the camera to simulate human binocular vision and thus capture three-dimensional images. This process is known as stereo photography. The cameras 42 can be configured to execute computer stereo vision in which three-dimensional information is extracted from digital images. In such embodiments, the orientation of the cameras 42 can be known and the respective video signals can be processed to triangulate an object with both video signals. This processing can be applied to determine the distance that the consumer is spaced from the object. Determining the distance that the consumer is spaced from the object can be executed by the processor 40 or by the commerce server 12 using known distance calculation techniques.

Processing of the one or more, forward-facing video signals can also be applied to determine the identity of the object. Determining the identity of the object, such as the identity of an item in the retail store, can be executed by the processor 40 or by the commerce server 12. If the processing is executed by the commerce server 12, the processor 40 can modify the video signals limit the transmission of data back to the commerce server 12. For example, the video signal can be parsed and one or more image files can be transmitted to the commerce server 12 instead of a live video feed. Further, the video can be modified from color to black and white to further reduce transmission load and/or ease the burden of processing for either the processor 40 or the commerce server 12. Also, the video can cropped to an area of interest to reduce the transmission of data to the commerce server 12.

In some embodiments of the present disclosure, the cameras 42 can include one or more inwardly-facing camera 42 directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 44 can be configured to generate an audio signal that corresponds to sound generated by and/or proximate to the consumer. The audio signal can be processed by the processor 40 or by the commerce server 12. For example, verbal signals can be processed by the commerce server 12 such as "this item appears interesting." Such audio signals can be correlated to the video recording.

The display 46 can be positioned within the consumer's field of view. Video content can be shown to the consumer with the display 46. The display 52 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 18 from the head mountable unit 14. The processor 40 can direct signals generated by components of the communications unit 18 to the commerce sever 12 through the transmitter 48. The transmitter 48 can be an electrical communication element within the processor 40. In one example, the processor 40 is operable to direct the video and audio signals to the transmitter 40 and the transmitter 48 is operable to transmit the video signal and/or audio signal from the head mountable unit 14, such as to the commerce server 12 through the network 20.

The receiver 50 can be configured to receive signals and direct signals that are received to the processor 40 for further processing. The receiver 50 can be operable to receive transmissions from the network 20 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® standards for exchanging data over short distances by using short-wavelength radio transmissions, and thus creating personal area network (PAN). The transmitter 48 and receiver 50 can also apply 3G or 4G, which is defined by the International Mobile Telecommunications-2000 (IMT-2000) specifications promulgated by the International Telecommunication Union.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the commerce server 12 can be played for the consumer through the speaker 52. The receiver 50 can receive the audio signal from the commerce server 12 and direct the audio signal to the processor 40. The processor 40 can then control the speaker 52 to emit the audio content.

The direction sensor 54 can be configured to generate a direction signal that is indicative of the direction that the consumer is facing. The direction signal can be processed by the processor 40 or by the commerce server 12. For example, the direction sensor 54 can electrically communicate the direction signal containing direction data to the processor 40 and the processor 40 can control the transmitter 48 to transmit the direction signal to the commerce server 12 through the network 20. By way of example and not limitation, the direction signal can be useful in determining the identity of an item(s) visible in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the commerce server 12 through the network 20.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in determining one or more items that are proximate to the consumer and are visible in the video signal. The commerce server 12 can receive position data and identify the location of the consumer in some embodiments of the present disclosure.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more items for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the commerce server 12 can process the acceleration signal to derive the velocity and acceleration of the consumer in the retail store.

The proximity sensor 62 can be operable to detect the presence of nearby objects without any physical contact. The proximity sensor 62 can apply an electromagnetic field or a beam of electromagnetic radiation such infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting an item.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is facing. The distance signal can be useful in determining the distance to an object in the video signal generated by one of the cameras 42, which can be useful in determining the consumer's location in the retail store.

Figure 3:
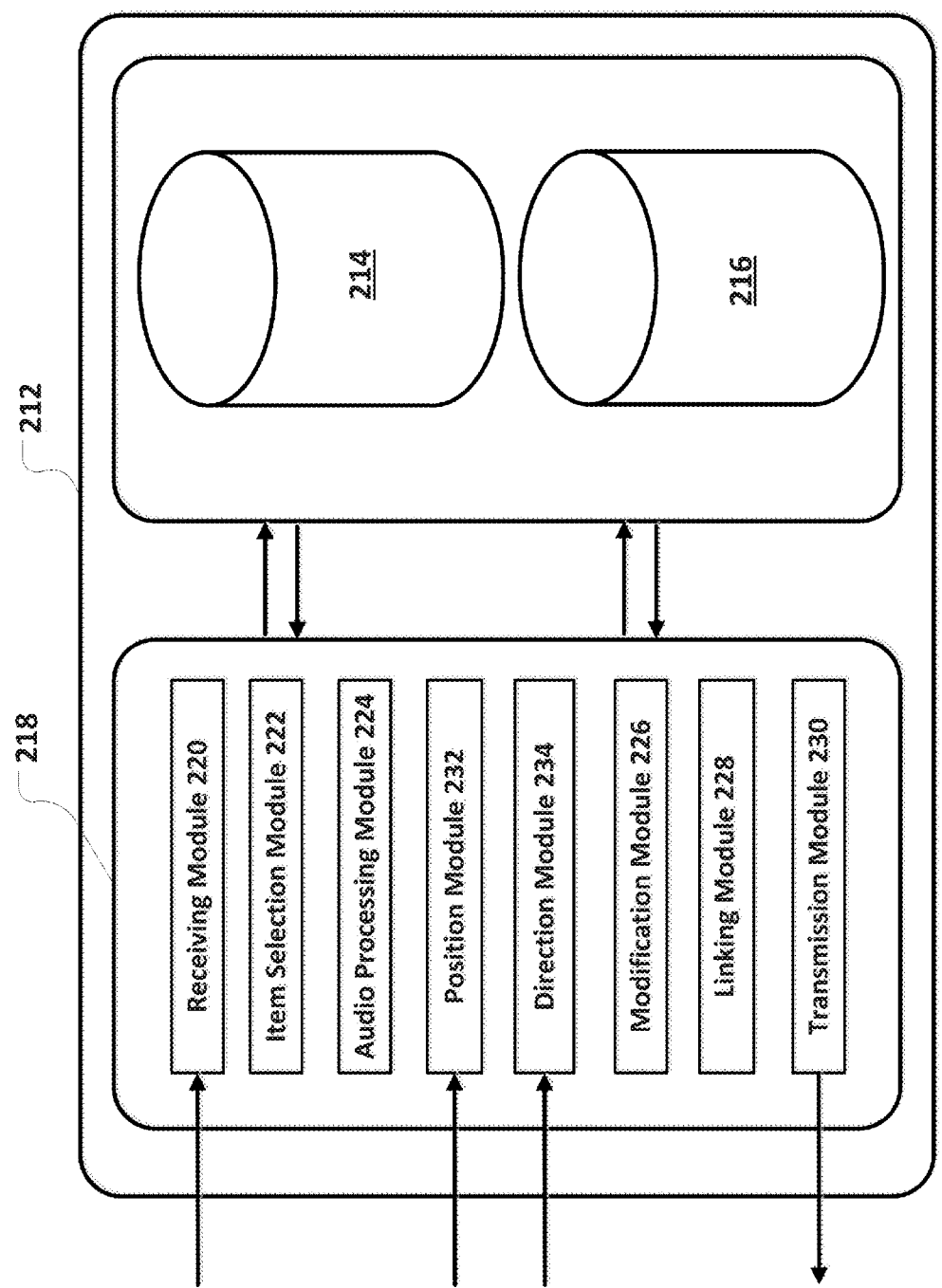
FIG. 3 is an example block diagram illustration a commerce server that can be applied in some embodiments of the present disclosure.

FIG. 3 is a block diagram illustrating a commerce server 212 according to some embodiments of the present disclosure. In the illustrated embodiment, the commerce server 212 can include an item database 214 and a shopping list database 216. The commerce server 212 can also include a processing device 218 configured to include a receiving module 220, an item selection module 222, an audio processing module 224, a modification module 226, a linking module 228, a transmission module 230, a position module 232, and a direction module 234.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The item database 214 can include in memory the identities of a plurality of items. The plurality of items can be the items offered for sale in a retail store associated with the commerce server 212. The item database 214 can also contain a floor plan of the retail store, including the location of each of the plurality of items within the retail store. The data in the item database 214 can be organized based on one or more tables that may utilize one or more algorithms and/or indexes.

The shopping list database 216 can include memory containing one or more shopping lists generated by consumers. Each of the shopping lists includes a plurality of items offered for sale in the retail store. Each of the plurality of shopping lists can be correlated to a particular consumer. The data in the shopping list database 216 can be organized based on one or more tables that may utilize one or more algorithms and/or indexes.

The processing device 218 can communicate with the databases 214, 216 and receive one or more consumer signals from the head mountable units 14, 14*a*. The processing device 218 can include computer readable memory storing computer readable instructions and one or more processors executing the computer readable instructions.

The receiving module 220 can be operable to receive signals over the network 20, assess the signals, and communicate the data contained in the signals to other components of the commerce server 212. The receiving module 220 can be configured to receive one or more shopping list signals from one or more consumers. The receiving module 220 can direct the data contained in shopping list signals to the shopping list database 216 to establish a shopping list for a particular consumer.

The receiving module 220 can also receive consumer signals from the head mountable units 14, 14*a*. The receiving module 220 can receive a consumer signal indicating that an item on the shopping list has been acquired by one of the consumers. The data in this consumer signal can be directed to the modification module 226 for further processing.

The receiving module 220 can receive a consumer signal indicating a first consumer desires communication with a second consumer. The data in this consumer signal can be directed to the linking module 226 for further processing, as will be set forth in greater detail below.

The receiving module 220 can receive a consumer signal indicating that the first consumer desires access to audio or video signals generated by the head mountable unit worn by the second consumer. The data in this consumer signal can be directed to the linking module 226 for further processing, as will be set forth below.

The receiving module 220 can receive a consumer signal containing audio data such as the voice of one of the consumers. The data in this consumer signal can be directed to the audio processing module 224 for further processing.

The item selection module 222 can access shopping lists stored in the shopping list database 216. The item selection module 222 can be configured to select an item from the shopping list shared by a pair of consumers or a shopping list shared by more than two consumers. The item selection module 222 can also access the item database 214 to correlate items on the shopping list with the locations of these items in the retail store. The selected item can be transmitted in a procuring signal to the consumer as a reminder of the current item to pursue.

The item selection module 222 can be configured to select items in the order that the items were added to the shopping list. Alternatively, the item selection module 222 can be configured to select items in an order that minimizes the distance a consumer must travel to acquire all of the items on the shopping list.

The transmission module 224 can be configured to transmit procuring signals, such as an item signal, to the consumer over the network 20. An item signal can correspond to the item from the shopping list that has been selected by the item selection module 222. The transmission module 224 and the item selection module 222 can thus function cooperatively. The item signal can be received by the head mountable unit 14 and result in the item being displayed on the display 46. A visual message resulting from the item signal can be continuously displayed until the item is acquired. Alternatively, the visual message resulting from the item signal can be displayed intermittently as the consumer travels to the location of the item within the retail store.

Speech by a consumer can be captured by the microphone 44 and transmitted to the commerce server 212. The voice of the consumer can be continuously monitored as the consumer shops in some embodiments of the present disclosure. The audio processing module 224 can analyze the audio data contained in a consumer signal, such as verbal statements made by a consumer. The audio processing module 224 can implement known speech recognition techniques to identify speech in an audio signal. The consumer's speech can be encoded into a compact digital form that preserves its information. The encoding can occur at the head mountable unit 14 or at the commerce server 212. The audio processing module 224 can be loaded with a series of models honed to comprehend language. When encoded locally, the speech can be evaluated locally, on the head mountable unit 14. A recognizer installed on the head mountable unit 14 can communicate with the commerce server 212 to gauge whether the voice contains a command can be best handled locally or if the commerce server is better suited to execute the command. The audio processing module 224 can compare the consumer's speech against a statistical model to estimate, based on the sounds spoken and the order in which the sounds were spoken, what letters might be contained in the speech. At the same time, the local recognizer can compare the speech to an abridged version of that statistical model applied by the audio processing module 224. For both the commerce server 212 and the head mountable unit 14, the highest-probability estimates are accepted as the letters contained in the consumer's speech. Based on these estimations, the consumer's speech, now embodied as a series of vowels and consonants, is then run through a language model, which estimates the words of the speech. Given a sufficient level of confidence, the audio processing module 224 can then create a candidate list of interpretations for what the sequence of words in your speech might mean. If there is enough confidence in this result, the audio processing module 224 can determine the consumer's intent.

In a first example, the consumer can state "I have acquired the current item" in an embodiment of the present disclosure. This statement can be conveyed in a consumer signal received by the commerce server 212. The statement can be processed and recognized by the audio processing module 224. In response, the audio processing module 224 can communicate the indication that an item has been acquired to the modification module 226 for further processing, as will be set forth in greater detail below.

In a second example, the consumer can state "show me what my co-shopper is seeing" in an embodiment of the present disclosure. This statement can be conveyed in a consumer signal received by the commerce server 212. The statement can be processed and recognized by the audio processing module 224. In response, the audio processing module 224 can direct the request for access to the linking module 228 for further processing.

The modification module 226 can be configured to modify a shopping list stored in the shopping list database 216 in response to a consumer signal. For example, the modification module 228 can modify the shopping list by removing an item from the shopping list that has been acquired by a consumer. The consumer can audibly state that the item has been acquired or can communicate acquisition of the item in some other way. The statement can be captured by the microphone 44 and transmitted as a consumer signal to the commerce server 212. The consumer signal can be received by the receiving module 220 and directed to the audio processing module 224. The audio processing module 224 can identify the statement in the consumer signal and direct the data that the item has been acquired to the modification module 226. The modification module 226 can then remove that item from the shopping list stored in the shopping list database 216.

The modification module 226 can also function cooperatively with the item selection module 222. For example, the modification module 226 can direct the item selection module 222 to select another item signal to transmit to the head mountable unit when the item associated with the current item signal has been acquired. The transmission module 230 can change from transmitting the first or current item signal to transmitting a second item signal different from the first item signal in response to the determination that the current item has been acquired.

The linking module 228 can be configured to execute access requests contained in consumer signals. An access request, for example, can arise when a first consumer requests to receive an audio feed, a video feed, or both from a second consumer. The audio feed requested by the first consumer can contain the statements made by the second consumer. The video feed can contain the video signal generated by the camera 42 of the augmented reality device worn by the second consumer. In response to an exemplary access request for a video feed, the linking module 228 can direct the transmission module 230 to transmit the video signal received from one consumer as a consumer signal, to the other consumer as a procuring signal.

The linking module 228 can also be configured to execute communication requests contained in consumer signals. A communication access request, for example, can arise when a first consumer requests to be placed in communication with a second consumer. For example, the first consumer can state "please let me speak with" the second consumer. The statement can be captured by the microphone 44 and transmitted as a consumer signal to the commerce server 212. The consumer signal can be received by the receiving module 220 and the data in the consumer signal can be directed to the audio processing module 224. The audio processing module 224 can identify the communication request in the data contained in the consumer signal and direct the request to the linking module 228. The linking module 228 can then direct the transmission module 230 to transmit the request to the other consumer as a procuring signal.

In response to receiving the communication request in a procuring signal from the commerce server 212, the second consumer can state "I will speak with" the first consumer. The statement can be captured by the microphone 44 and transmitted as a consumer signal to the commerce server 212. The consumer signal can be received by the receiving module 220 and directed to the audio processing module 224. The audio processing module 224 can identify the acceptance of the communication request in the consumer signal from the second consumer and direct the indication of the second consumer's acceptance to the linking module 228. The linking module 228 can then direct the receiving module 220 to direct audio signals received from either head mountable unit 14 or 14a to the transmission module 230. The linking module 228 can also direct the transmission module 230 to transmit audio signals received from one of the head mountable units 14, 14a, to the other head mountable unit 14, 14a. The first and second augmented reality devices, as well as the consumers wearing the augmented reality devices, are thereby linked in communication with one another.

In some embodiments, the processing device 218 can also include the position module 232 and the direction module 234. The position module 232 can receive the position signal from the head mountable unit 14. The position signal can be generated by the position sensor 56 and contain data corresponding to a location of the respective head mountable unit 14 or 14a in the retail store. The direction module 234 can receive the direction signal from the head mountable units 14, 14a. The direction signal can be generated by the direction sensor 54 and contain data corresponding to a location of the respective head mountable unit 14 or 14a in the retail store.

The linking module 228 can also be configured to execute location requests contained in consumer signals. A location request, for example, can arise when a first consumer requests to be advised of the location of a second consumer within the retail store. For example, the first consumer can state "please show me the location of" the second consumer. The statement can be captured by the microphone 44 and transmitted as a consumer signal to the commerce server 12. The consumer signal can be received by the receiving module 220 and directed to the audio processing module 224. The audio processing module 224 can identify the location request in the consumer signal and direct the request to the linking module 228. The linking module 228 can then receiving position and direction data from the position module 232 and the direction module 234. The linking module 228 can then generate a map and direct the transmission module 230 to transmit the map showing the locations of both consumers to the requesting consumer as a procuring signal.

It is noted that the various processing functions set forth above can be executed differently than described above in order to enhance the efficiency of an embodiment of the present disclosure in a particular operating environment. The processor 40 can assume a greater role in processing some of the signals in some embodiments of the present disclosure. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 4A:
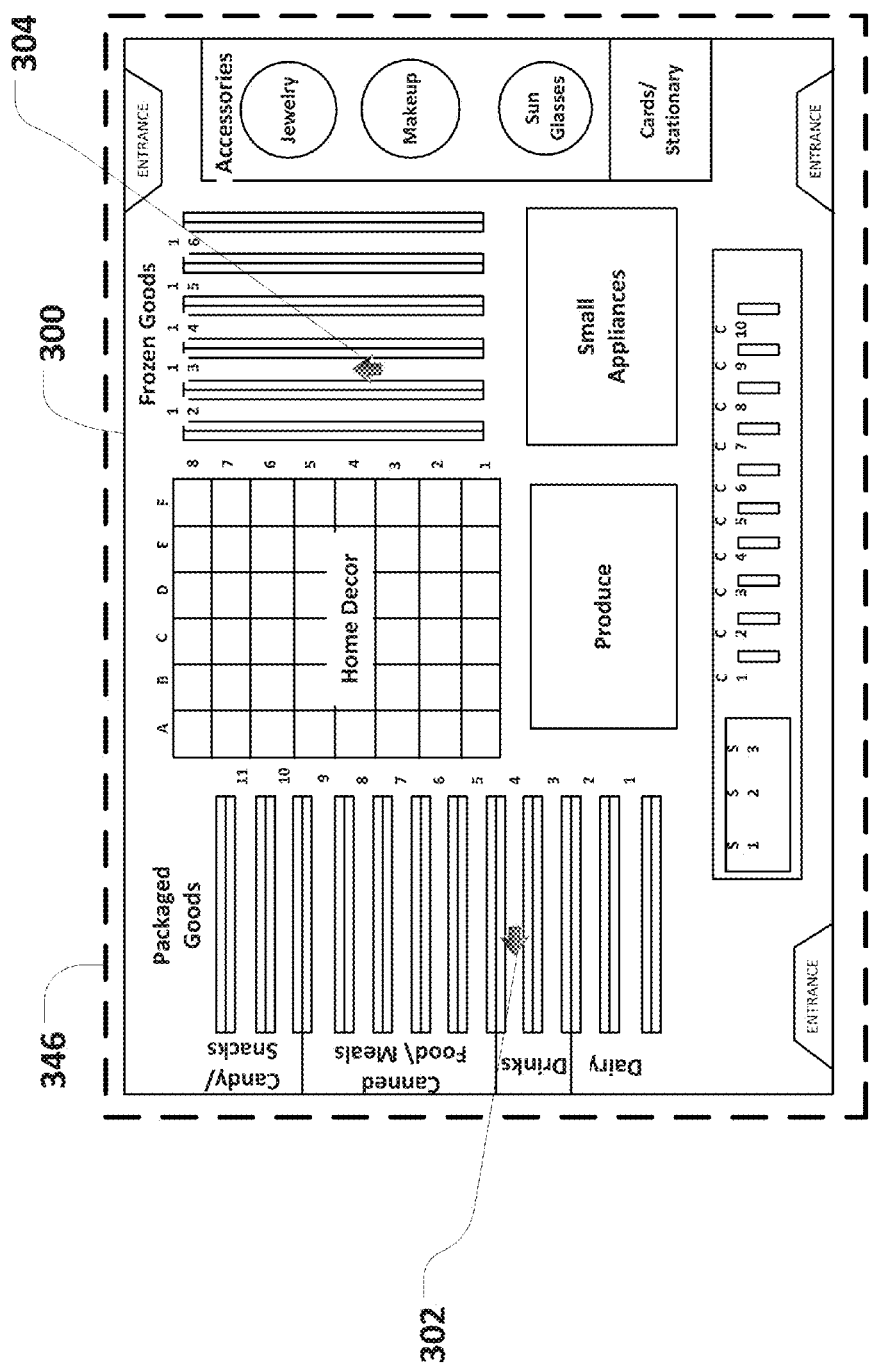
FIG. 4A is an example map that can be generated and made visible to a consumer while shopping in some embodiments of the present disclosure.

FIG. 4A is an example map 300 that can be generated by the linking module 228 and transmitted by the transmission module 230 to one or both of the augmented reality devices. The data for generating the map 300 can be contained in a procuring signal received by the augmented reality devices. The location of one or both consumers can be among the data applied by the augmented reality devices to generate the map 300. The map 300 can be generated on the display 346 of one of the head mountable units 14 or 14a. The map 300 can be made visible to a consumer while the consumer is shopping in some embodiments of the present disclosure.

In the illustrated example, the map 300 is a map of a retail location that has been annotated with words that indicate the different regions of the retail location. For example, the retail store includes "frozen goods" region, a "candy and snacks" region, and a "produce" region. Aisles within some of the regions of the retail store are also annotated numerically. Visual indicia 302 and 304 can correspond to the locations of first and second consumers within the retail store, wherein each is wearing an augmented reality device. The exemplary indicia 302, 304 can also indicate the direction that each consumer is facing. The visual indicia 302 and 304 can be colored differently from the remainder of the map 300 or can be flashing in order to be more easily located. While the example illustrates the map being annotated using words, it should be appreciated that the heat map can be annotated in any suitable manner, including but not limited to, annotated with colors, symbols, and/or patterns.

Figure 4B:
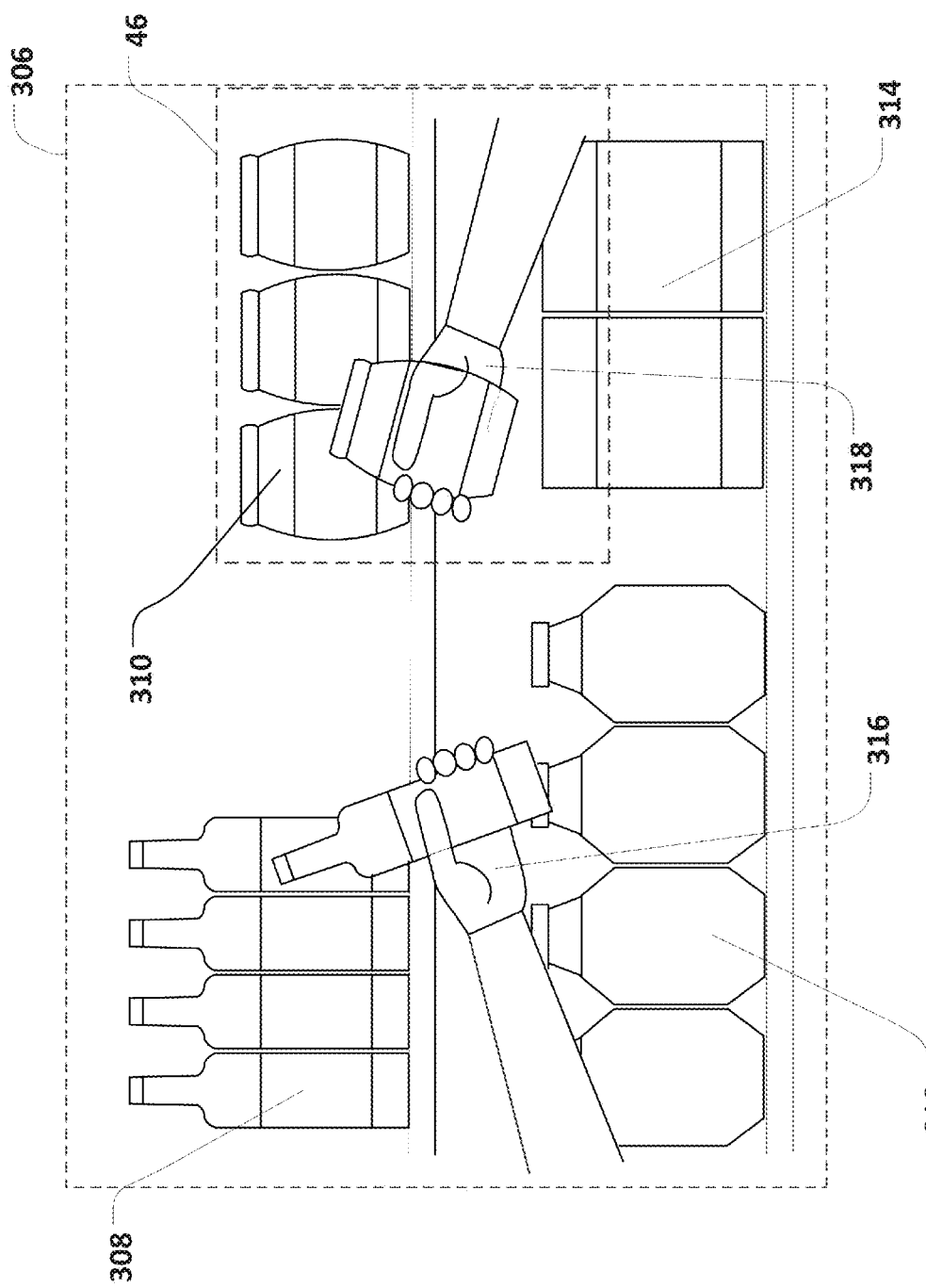
FIG. 4B is an exemplary field of view of a first consumer that can be communicated as a video signal to a second consumer in some embodiments of the present disclosure.

FIG. 4B is an exemplary field of view of a first consumer that can be communicated as a video signal to a second consumer in some embodiments of the present disclosure. The first consumer's field of view is bounded in this example by the box referenced at 306. A portion of the consumer's field of view is overlapped by the display 46 of an augmented reality device. In FIG. 4B, the display 46 is not engaged and can therefore be substantially transparent. The boundary of the display 46 is illustrated by dashed lines to enhance the clarity of the other elements of FIG. 4B.

The consumer can be viewing a store shelving structure supporting items 308, 310, 312, 314. Items 308, 310, 312, 314 can be competing brands of a particular kind of product. The consumer can be considering which of the items 308, 310, 312, 314 to purchase. In this example, the consumer has narrowed the decision to items 308 and 310. In FIG. 4B, the consumer's hands 316, 318 are shown holding samples of the item 308 and 310. At this point, in some embodiments of the present disclosure, the consumer can transmit a communication request with the augmented reality device. The consumer can seek the assistance of the other consumer in making the decision between items 308 and 310. In response to the request for communication, the commerce server 212 can establish a link between the first and second consumers.

Figure 4C:
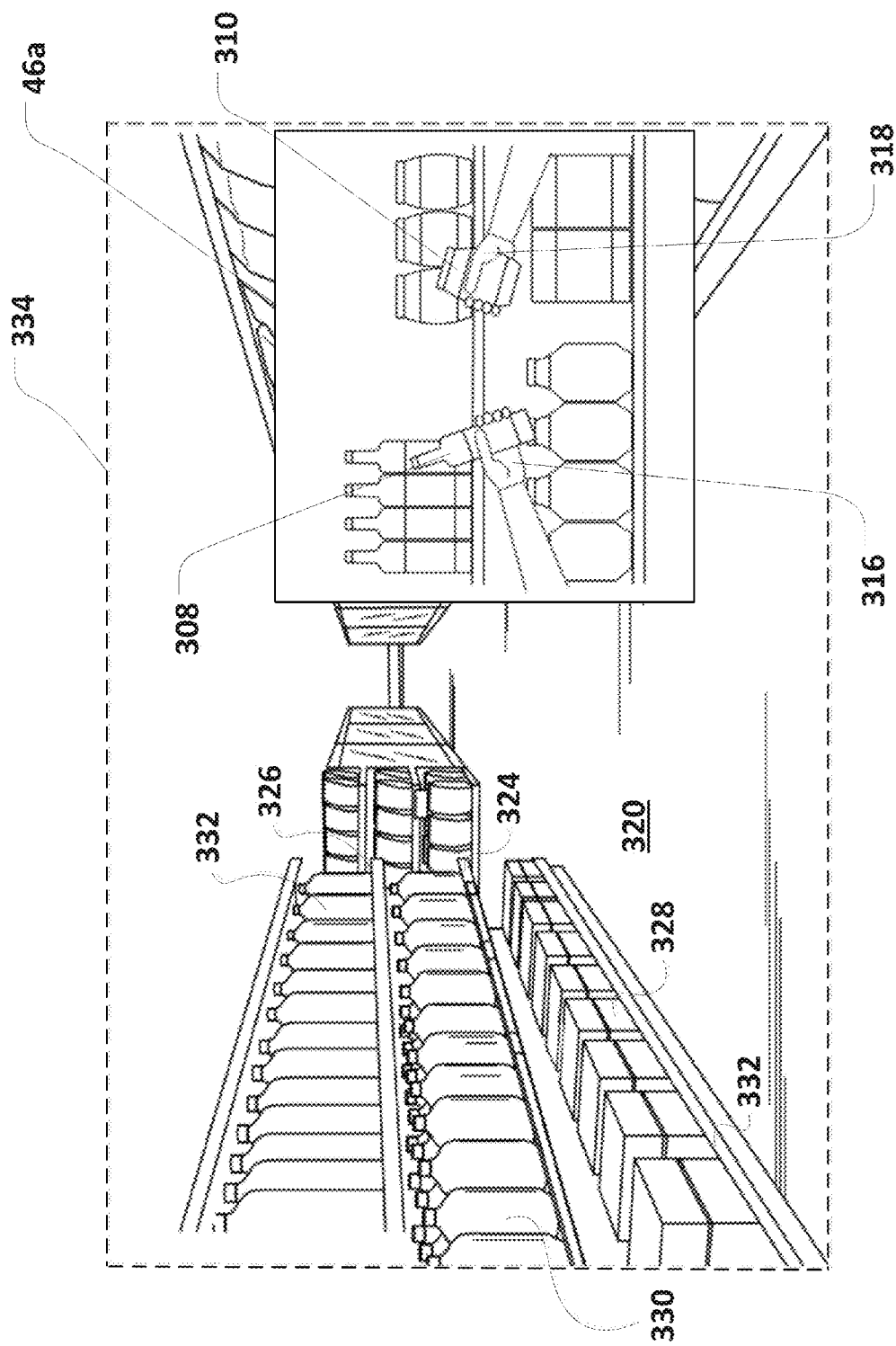
FIG. 4C is an exemplary field of view of the second consumer as the second consumer receives the video signal from a first consumer in some embodiments of the present disclosure.

FIG. 4C is an exemplary field of view of the second consumer as the second consumer receives the video signal from a first consumer in some embodiments of the present disclosure. The second consumer's field of view is bounded in this example by the box referenced at 334. The camera 42 of the augmented reality device worn by the first consumer can capture the field of view shown in FIG. 4B and transmit a video signal containing the field of view. The second consumer can be looking down an aisle 320 in which shelves 322, 324, 326 support various products 328, 330, 332.

The video signal generated by the augmented reality device of the first consumer can be displayed on the display 46a of the augmented reality device worn by the second consumer. Audio communication, back-and-forth, between the first and second consumers can also be established as the video data contained in the video signal generated by the first augmented reality device is visible on the display 46a of the second augmented reality device. The second consumer and the first consumer can converse and jointly decide which of the items 308 or 310 to purchase.

Figure 5:
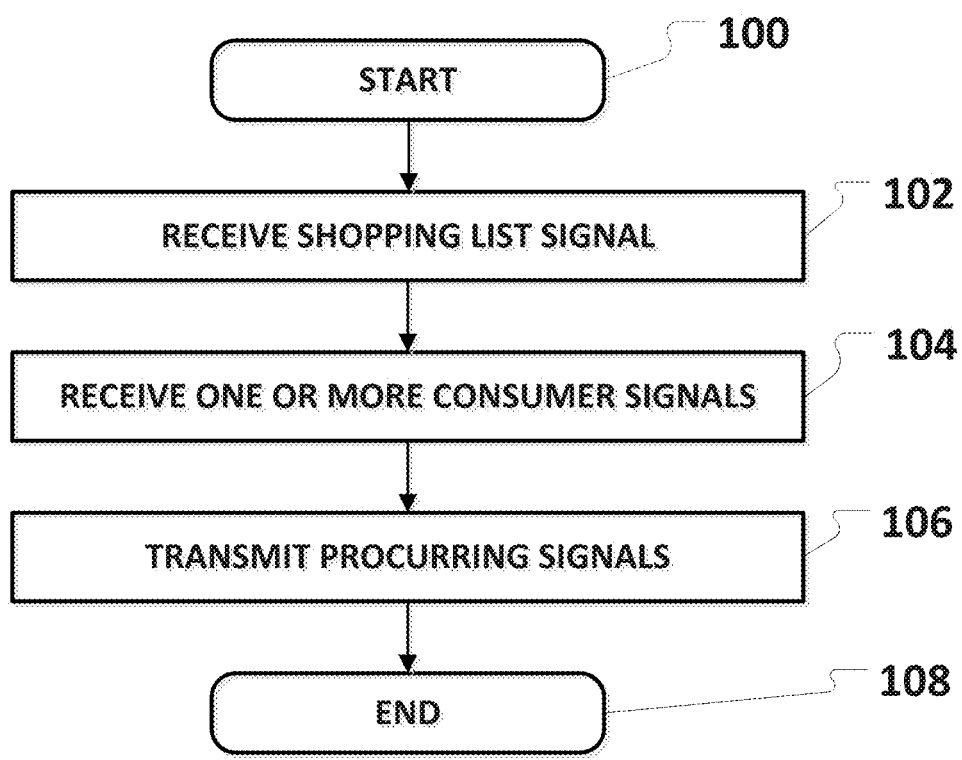
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 5 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can receive one or more shopping list signals from an electronic computing device to establish a shopping list of a plurality of items offered for sale in a retail store.

At step 104, the commerce server can receive one or more consumer signals. Consumer signals can be received from one or both of first and second augmented reality devices. The augmented reality devices can be respectively worn by first and second consumers as at least one of the first and second consumer shops in the retail store.

At step 106, the commerce server can transmit a procuring signal containing data associated with the shopping list to the first augmented reality device and/or the second procuring signal containing data associated with the shopping list to the second augmented reality device. The procuring signals can be applied to assist the first and second consumers in cooperatively shopping for items on the shopping list. The exemplary process ends at step 108.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method comprising:
providing a first computer program product executable by a first augmented reality device, the first augmented reality device being wearable by a first human consumer in a retail store;
providing a second computer program product executable by a second augmented reality device, the second augmented reality device being wearable by a second human consumer in the retail store;
accessing, by a processing device of a commerce server, a shopping list, the shopping list listing a plurality of items offered for sale in the retail store;
communicating, by the processing device, with the first augmented reality device, wherein communicating with the first augmented reality device comprises:
transmitting, by the processing device, a first item signal to the first augmented reality device, the first item signal identifying a first item on the shopping list and causing the first computer program product to display a first visual message identifying the first item on a display of the first augmented reality device;
receiving, by the processing device, a first video signal from the first augmented reality device, wherein the first video signal is generated by an inwardly-facing camera of the first augmented reality device, the inwardly-facing camera of the first augmented reality device is directed toward eyes of the first human consumer, and the first video signal contains one or more video images showing the eyes of the first human consumer; and
receiving, by the processing device, a second video signal from the first augmented reality device, the second video signal being generated by a forward-facing camera of the first augmented reality device;
communicating, by the processing device, with the second augmented reality device, wherein communicating with the second augmented reality device comprises:
transmitting, by the processing device, a second item signal to the second augmented reality device, the second item signal identifying a second item on the shopping list and causing the second computer program product to display a second visual message identifying the second item on a display of the second augmented reality device;
receiving, by the processing device, a third video signal from the second augmented reality device, wherein the third video signal is generated by an inwardly-facing camera of the second augmented reality device, the inwardly-facing camera of the second augmented reality device is directed toward eyes of the second human consumer, and the third video signal contains one or more video images showing the eyes of the second human consumer; and
receiving, by the processing device, a fourth video signal from the second augmented reality device, the fourth video signal being generated by a forward-facing camera of the second augmented reality device;
correlating, by the processing device, the first video signal to the second video signal to determine a first object the first human consumer is viewing; and
correlating, by the processing device, the third video signal to the fourth video signal to determine a second object the second human consumer is viewing;
wherein:
communicating with the first augmented reality device further comprises:
transmitting, by the processing device, a third item signal to the first augmented reality device, the third item signal indicating that the second item has been obtained by the second human consumer;
and communicating with the second augmented reality device further comprises:
transmitting, by the processing device, a fourth item signal to the second augmented reality device, the fourth item signal indicating that the first item has been obtained by the first human consumer.

2. The computer-implemented method of claim 1 wherein:
communicating with the first augmented reality device further comprises:
receiving, by the processing device, a first consumer signal from the first augmented reality device.

3. The computer-implemented method of claim 1 wherein:
communicating with the first augmented reality device further comprises:
transmitting, by the processing device, the fourth video signal to the first augmented reality device.

4. The computer-implemented method of claim 1 wherein:
communicating with the first augmented reality device further comprises:
receiving, by the processing device, an audio signal from the first augmented reality device.

5. The computer-implemented method of claim 4 wherein:
communicating with the second augmented reality device further comprises:
transmitting, by the processing device, the audio signal to the second augmented reality device.

6. The computer-implemented method of claim 1 further comprising:
removing, by the processing device, the first item from the shopping list; and
removing, by the processing device, the second item from the shopping list.

7. The computer-implemented method of claim 1 wherein:

communicating with the first augmented reality device further comprises:
receiving, by the processing device, a first position signal from the first augmented reality device, the first position signal identifying a first location of the first augmented reality device.

8. The computer-implemented method of claim 7 further comprising:
generating, by the processing device, a map showing the first location of the first augmented reality device.

9. A system comprising:
a commerce server comprising a processing device, wherein the processing device is configured to:
access a shopping list, the shopping list listing a plurality of items offered for sale in a retail store;
communicate with a first augmented reality device, the first augmented reality device being wearable by a first human consumer in the retail store, wherein communicating with the first augmented reality device comprises:
transmitting a first item signal to the first augmented reality device, the first item signal identifying a first item on the shopping list and causing the first augmented reality device to display a first visual message identifying the first item on a display of the first augmented reality device;
receiving a first video signal from the first augmented reality device, wherein the first video signal is generated by an inwardly-facing camera of the first augmented reality device, the inwardly-facing camera of the first augmented reality device is directed toward eyes of the first human consumer, and the first video signal contains one or more video images showing the eyes of the first human consumer; and
receiving a second video signal from the first augmented reality device, the second video signal being generated by a forward-facing camera of the first augmented reality device;
communicate with a second augmented reality device, the second augmented reality device being wearable by a second human consumer in the retail store, wherein communicating with the second augmented reality device comprises:
transmitting a second item signal to the second augmented reality device, the second item signal identifying a second item on the shopping list and causing the second augmented reality device to display a second visual message identifying the second item on a display of the second augmented reality device;
receiving a third video signal from the second augmented reality device, wherein the third video signal is generated by an inwardly-facing camera of the second augmented reality device, the inwardly-facing camera of the second augmented reality device is directed toward eyes of the second human consumer, and the third video signal contains one or more video images showing the eyes of the second human consumer; and
receiving a fourth video signal from the second augmented reality device, the fourth video signal being generated by a forward-facing camera of the second augmented reality device;
correlate the first video signal to the second video signal to determine a first object the first human consumer is viewing; and
correlate the third video signal to the fourth video signal to determine a second object the second human consumer is viewing;

wherein:
communicating with the first augmented reality device further comprises:
transmitting a third item signal to the first augmented reality device, the third item signal indicating that the second item has been obtained by the second human consumer;
and communicating with the second augmented reality device further comprises:
transmitting a fourth item signal to the second augmented reality device, the fourth item signal indicating that the first item has been obtained by the first human consumer.

10. The system of claim 9 wherein:
communicating with the first augmented reality device further comprises:
receiving a first consumer signal from the first augmented reality device.

11. The system of claim 9 wherein:
communicating with the first augmented reality device further comprises:
transmitting the fourth video signal to the first augmented reality device.

12. The system of claim 9 wherein:
communicating with the first augmented reality device further comprises:
receiving an audio signal from the first augmented reality device.

13. The system of claim 12 wherein:
communicating with the second augmented reality device further comprises:
transmitting the audio signal to the second augmented reality device.

14. The system of claim 9 wherein the processing device is further configured to:
remove the first item from the shopping list; and
remove the second item from the shopping list.

15. The system of claim 9 wherein:
communicating with the first augmented reality device further comprises:
receiving a first position signal from the first augmented reality device, the first position signal identifying a first location of the first augmented reality device.

16. The system of claim 15 wherein the processing device is further configured to:
generating, by the processing device, a map showing the first location of the first augmented reality device.

17. The system of claim 9 further comprising:
the first augmented reality device; and
the second augmented reality device.

18. The system of claim 9 further comprising:
the first augmented reality device; and
the second augmented reality device;
wherein the processing device is further configured to:
remove the first item from the shopping list; and
remove the second item from the shopping list.

19. The computer-implemented method of claim 1 further comprising:
removing, by the processing device, the first item from the shopping list; and
removing, by the processing device, the second item from the shopping list;
wherein:
communicating with the first augmented reality device further comprises:

receiving, by the processing device, a first consumer signal from the first augmented reality device;
transmitting, by the processing device, the fourth video signal to the first augmented reality device;
receiving, by the processing device, an audio signal from the first augmented reality device; and
receiving, by the processing device, a first position signal from the first augmented reality device, the first position signal identifying a first location of the first augmented reality device;
and
communicating with the second augmented reality device further comprises:
transmitting, by the processing device, the audio signal to the second augmented reality device.

20. The system of claim 9 further comprising:
the first augmented reality device; and
the second augmented reality device;
wherein:
communicating with the first augmented reality device further comprises:
receiving a first consumer signal from the first augmented reality device;
transmitting the fourth video signal to the first augmented reality device;
receiving an audio signal from the first augmented reality device; and
receiving a first position signal from the first augmented reality device, the first position signal identifying a first location of the first augmented reality device;
communicating with the second augmented reality device further comprises:
transmitting the audio signal to the second augmented reality device;
and
the processing device is further configured to:
remove the first item from the shopping list; and
remove the second item from the shopping list.

\* \* \* \* \*